UNITED STATES PATENT OFFICE 2,016,835

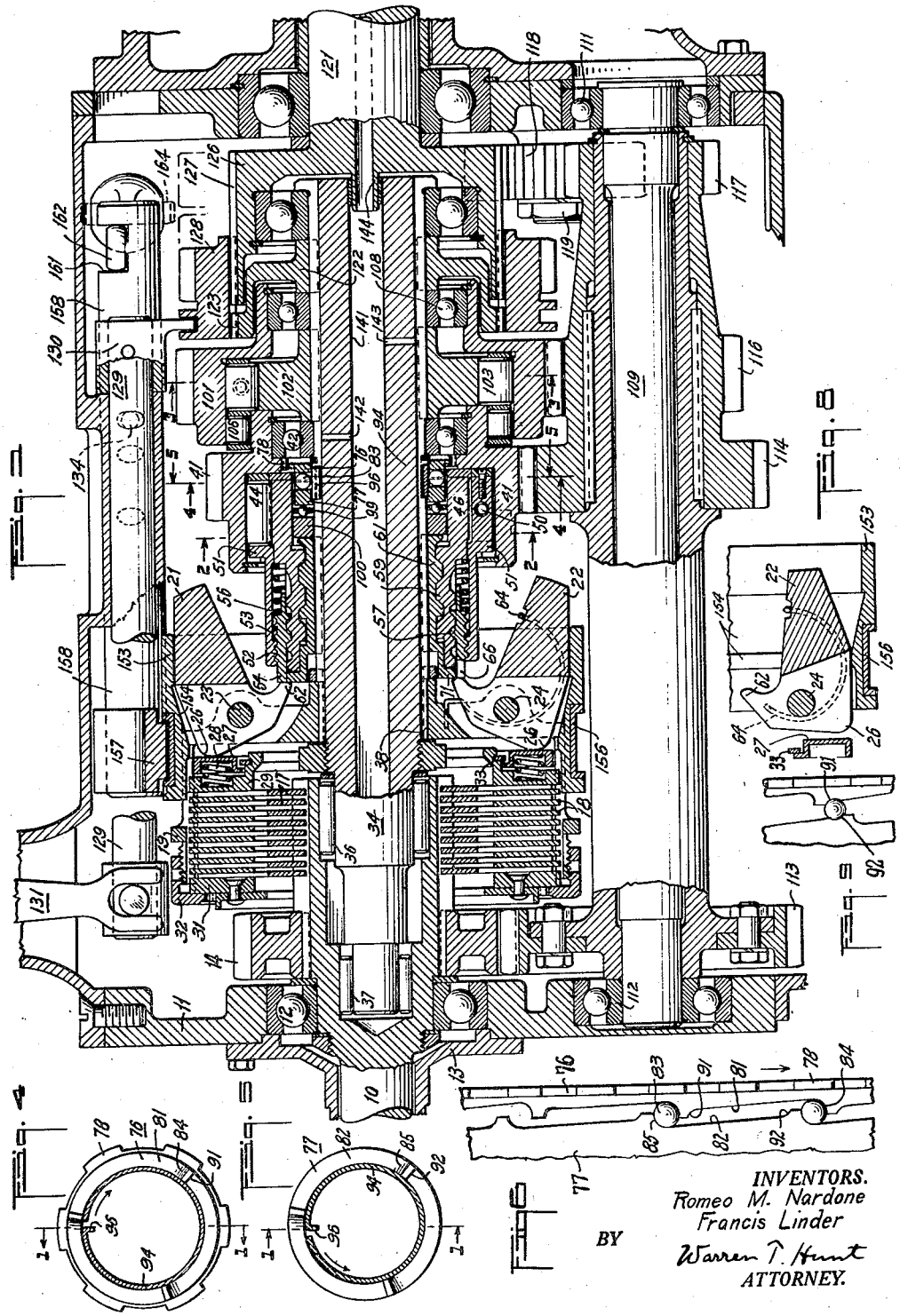

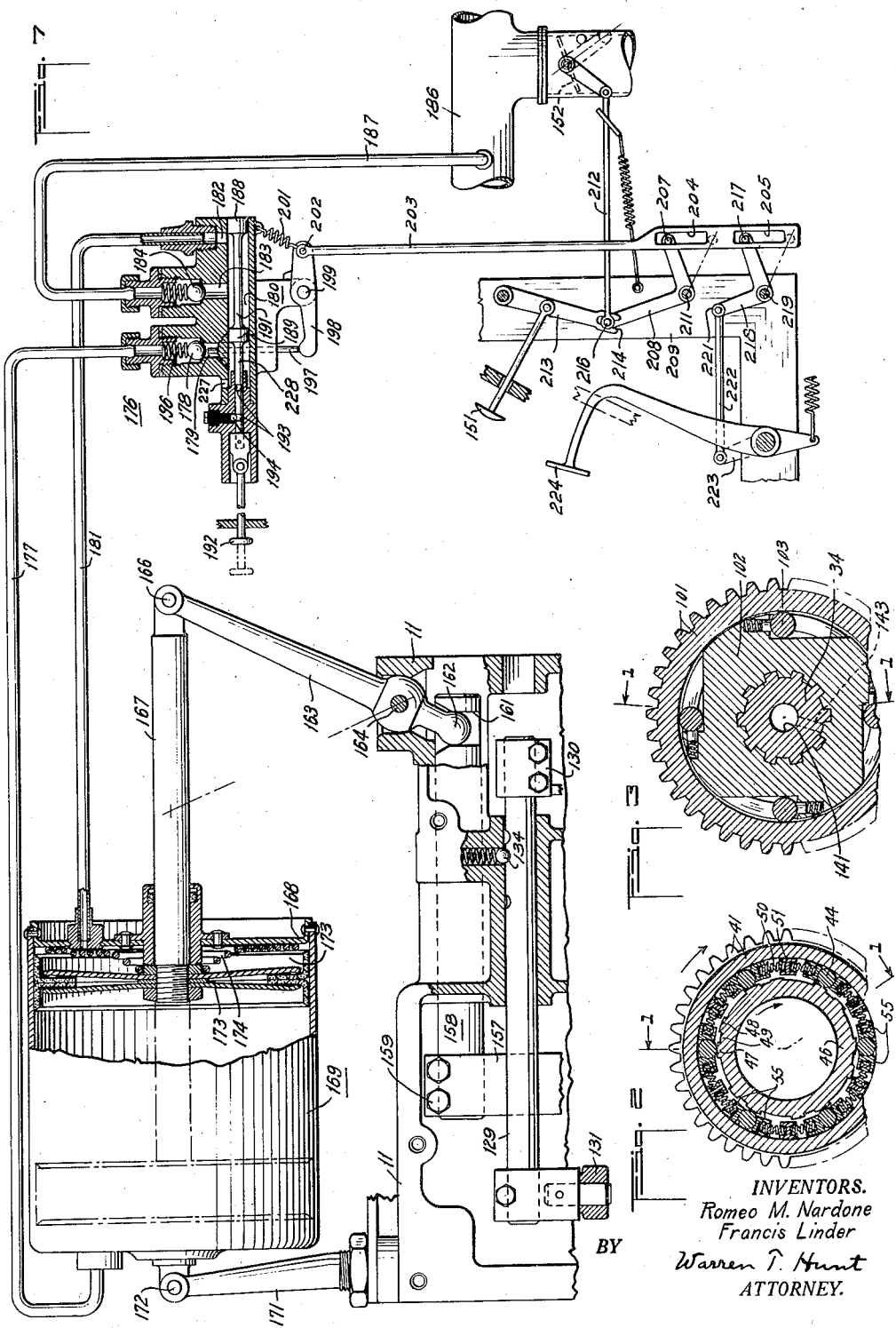

TRANSMISSION

Romeo M. Nardone and Francis Linder, East Orange, N. J., assignors, by mesne assignments, to Eclipse Aviation Corporation, East Orange, N. J., a corporation of New Jersey Application December 8, 1932, Serial No. 646,330

21 Claims. (Cl. 74—336)

This invention relates to transmission mechanisms and more particularly to automatic variable speed transmission mechanisms such as are adaptable for use in automotive vehicles. The present application is an improvement upon the invention of co-pending application, Serial No. 617,887, filed June 17, 1932 by Romeo M. Nardone as sole inventor.

The transmission which is herein used as illustrative of the invention, is particularly useful in automotive vehicles which are propelled by internal combustion engines and in this connection it is desirable under certain conditions to cause the automatic change mechanism to become inoperative and to lock the transmission in one of the various speed ratios. In the illustrative embodiment the second speed gear is the one used for the positive or non-automatic gear, the term "positive" being used in order to distinguish that gear drive from the automatic gear drives which are selected in accordance with certain variables such as torque and speed. The selection of the particular gear for use as a positive drive is optional, but in automotive vehicle transmissions as usually constructed, the second speed or intermediate gear serves the purpose in a satisfactory manner, either to use the engine as a brake in descending a hill or to positively drive the vehicle up a hill.

A feature of the present invention relates to a novel means of positively engaging a gear driving train.

Another feature of the invention relates to a novel automatic means for causing the first or low speed gear driving means to disengage the second and high speed driving means during the time that the vehicle is operating in the low gear speed ratio.

The means disclosed comprises a pair of face cams that move relatively to each other to move a nut axially of the transmission for positively disengaging the high speed gear clutch. The disengaging means of the low speed gear ratio is also cooperative with other elements associated with the second speed gear driving means to disengage that gear when the first gear is operative to drive the vehicle.

Another feature of the invention relates to a novel interconnection of the positive gear change mechanism with vehicle control members such as the accelerator or clutch pedals whereby the positive gear change may be preselected and afterwards manually controlled by an operation of one or more of the vehicle pedals or other manually actuated members.

An object of the invention is to provide an automatic variable speed transmission mechanism which is responsive to a number of variables such as driven shaft load, engine speed, vehicle speed, or a combination of any of them.

Another object of the invention is to provide an automatic variable speed transmission mechanism in which any of the lower speed devices will automatically disengage all other devices having a higher driving speed ratio.

Another object of the invention is to provide an automatic variable speed mechanism with a novel device for positively engaging one of the gear driving means in a manner to cause that gear driving means to be independent of the variables which produce gear changes in the automatic operation of the transmission.

Another object of the invention is to provide an automatic variable speed transmission in which one of the gear driving ratios may at the will of the operator be retained as the driving means.

Other features and objects of the invention will be apparent from the following description in connection with which a preferred embodiment of the invention has been illustrated in the accompanying drawings in which Fig. 1 is a longitudinal sectional view of the improved transmission;

Fig. 2 is a sectional view of the overrunning clutch used in the intermediate driving gear train, taken along the line 2—2 of Fig. 1;

Fig. 3 is a sectional view of the first speed overrunning clutch taken along the line 3—3 of Fig. 1;

Fig. 4 is an end view of one of the cams used to disengage the high speed clutch during operation of the first speed gear train, the cam being viewed in the direction of the arrows 4—4 in Fig. 1;

Fig. 5 is an end view of the other cam member which cooperates with the one shown in Fig. 4 and illustrates the cam as viewed in the direction of the arrows 5—5 in Fig. 1;

Fig. 6 is a fragmental view illustrating the assembly of the cams shown in Figs. 4 and 5, the view being a development of the cam surfaces in order to better illustrate the action;

Fig. 7 is a diagrammatic view illustrating the servo-motor used for positively engaging the second speed gear and also its interconnection with manually operated preselecting device and the vehicle and engine controls;

Fig. 8 is a somewhat diagrammatic fragmental view, showing the operative position of the clutch releasing collar; and Fig. 9 is a fragmental view showing the cams of Fig. 6 in position to disengage the high speed clutch.

In the drawings, and particularly with reference to Fig. 1, 10 is the engine shaft that is rotatably mounted in transmission casing 11 by bearing 12 and secured against endwise movement in the casing by cap member 13. A gear member 14 is secured to the shaft 10 within the casing and the shaft is also provided with a clutch having a number of friction plates 17 which are slidably splined upon the shaft and cooperate with a second series of friction plates 18 which are slidably splined to the clutch housing 19. The clutch housing is provided with a plurality of centrifugal weights 21 and 22 which are pivotally mounted at 23 and 24 respectively to the housing and adapted to swing outwardly by centrifugal action to force plates 17 and 18 into frictional engagement for connecting the shaft 10 to the housing 19. The nose 26 of each weight coacts through a plate 27 to collapse the spring 28 and force pressure plate 29 toward the left against the plates which in their driving position are clamped between plate 29 and backing plate 31 which is splined to housing 19 and held from moving to the left by nut 32. The resilient plate 27 is preferably secured to the pressure plate 29 by a lock ring 33. A shaft 34 is rotatably mounted within shaft 10 by bearings 36 and 37 and has a splined connection with the clutch housing 19, as shown at 38.

A second-speed gear 41 is rotatably mounted upon shaft 34 by bearing 42 and is provided with a two-way overrunning clutch illustrated in Fig. 2, one roller 44 of which is illustrated in Fig. 1. The inner race 46 of the second-speed gear overrunning clutch is provided with a pair of cam faces 47 and 48 which are inclined in opposite directions and separated by a cut-out portion 49. Rollers 44 are adapted to be moved in either direction, as viewed in Fig. 2, by cage 51 whereby a driving connection is established between the race 46 and the gear member 41. Movement of the rollers 44 by the cage 51 is obtained through the springs 50 which coact between the cage and socket members 55 for permitting slight additional movement of the cage after the rollers have been wedged between the cam faces 47 or 48 and the gear member 41. The cage 51 is provided with internal threads 52 which coact with external threads 53 upon member 54 which is urged toward the left, as viewed in Fig. 1, by spring 56. Member 54 is also provided with internal threads 57 which coact with external threads formed on the inner race member 46 of the second-speed gear and which is also provided with internal threads 59 which coact with external threads on nut 61 which is slidably splined to shaft 34. It is preferred that member 54 engage the noses 62 of weights 21 and to clear the weights 22 which are normally forced outwardly by springs 64; cut-out portions 66 being provided in member 54 to allow weights 22 to be moved outwardly without contacting the member 54. Member 61 is provided with a flange 71 which contacts weights 21 and 22, it being understood that any number of weights 21 and 22 may be used, but it is preferred to use six weights and to have two or three of them adapted to contact the member 54. Threads 52, and the outer threads 53 of member 54 are so formed that movement of spring pressed member 54 toward the left, as viewed in Fig. 1, rotates the cage 51 and rollers 44 counter clockwise, as viewed in Fig. 2, whereby the rollers are cramped between the cam 47 and the gear member 41, it being understood that in the forward operation of the vehicle both the shaft 34 and the gear 41 will rotate in a clockwise direction, as shown by the arrows in Fig. 2. Outward movement of weights 21 to the position shown in Fig. 1 will force member 54 toward the right and rotate the cage 51 in a clockwise direction, whereby the rollers 44 are cramped between the cams 48 and the gear member 41.

It may be seen from the above description that when the member 54 is moved toward the left, as viewed in Fig. 1, the gear 41 may overrun the shaft 34, but the shaft may drive the gear, and that when member 54 is forced toward the right by weights 21 to the position shown in Fig. 1, the rollers 44 will be forced between the cam 48 and the gear 41 in which position shaft 34 may overrun the gear, but the gear may drive the shaft, in all cases assuming that the direction of movement is in a clockwise direction. The threads of nut 61 are so formed that when gear 41 becomes a forward driving member, the member 61 is moved toward the left, as viewed in Fig. 1, in which position it contacts the noses 62 of all weights 21 and 22 and forces them to their inner position wherein the clutch plates 17 and 18 are disengaged. Intermediate the inner race 46 and the shaft 34 is a pair of face cam members 76 and 77, rotatably mounted upon shaft 34, cam 76 being secured to the gear 41 by splines 78. Each of the cam members 76 and 77 is provided with a plurality of cam faces 81 and 82 between which are balls 83; shoulders 84 and 85 being provided respectively on the cams 76 and 77 for limiting the travel of the ball cam members when the relative rotation is in one direction and similar shoulders 91 and 92 being provided for limiting the travel of the ball cam members when the relative rotation is in the reverse direction. Cam 77 is preferably in frictional engagement with shaft 34 by a spring ring 94 which has one end 96 bent over one of the splines of shaft 34 whereby it is held against rotation relative to the shaft. Spring ring 94 is preferably so constructed that rotation of the gear 41 in a forward direction at a greater speed than shaft 34 tends to expand the ring radially and to exert a frictional pressure upon the cam member 77 to retard its rotary movement relative to the shaft 34. As cam 76 is secured to gear 41 by splines 78 it may be seen that if gear 41 overruns shaft 34, the cam 77 will lag behind cam 76 and the parts will assume the position shown in Fig. 9 wherein cam 77 has been moved axially toward the left. The purpose of the cams is to disengage the high speed clutch during operation of the low speed drive as is hereafter more fully described. A thrust bearing 99 is provided between cam 77 and a thrust collar 100 which in turn acts upon nut 61 whereby when cam member 77 has reached its limit of axial movement toward the left, it may rotate freely with respect to nut member 61.

First-speed gear 101 has its inner race 102 splined to the shaft 34; an overrunning clutch of conventional form being incorporated between the gear and the race which is illustrated in Fig. 3. Rollers 103 are adapted to permit gear 101 to drive shaft 34 in a clockwise direction, as viewed in Fig. 3 and to permit shaft 34 to overrun gear 101 in the same direction. Gears 41 and 101 are mutually supported by bearing 106 which contacts with overhanging flanges of the two gears, and bearing 108 is used to rotatably mount the gear 101 directly upon the shaft 34. A countershaft 109 is rotatably mounted in housing 11 by bearings 111 and 112 upon which is secured gear 113 in constant mesh with gear 14, and gears 114 and 116 in constant mesh with gears 41 and 101 respectively. A reverse gear 117 is also secured to counter shaft 109 and is in constant mesh with an idler pinion 118 rotatably mounted upon the casing 11 by stud 119.

Means are provided for disconnecting shaft 34 from the vehicle propeller shaft 121 which comprises a member 122 splined to the shaft 34 and having external teeth 123. Propeller shaft 121 is provided with an enlargement 126 having splined teeth 127 which are adapted to mesh with corresponding splined teeth in coupler 128 which is manually slidable by means of rod 129, yoke 130, and lever 131. In the position shown in Fig. 1, coupler 128 has been moved to its extreme position toward the left, whereby teeth 123 and teeth 127 are both engaged by the coupling, and shaft 121 is in direct connection with shaft 34.

A resilient stop 134 is provided in the casing for locating the various positions of rod 129. The first movement of coupler 128 toward the right, as viewed in Fig. 1, will disengage teeth of the coupler from member 122 and place the transmission in neutral, this position of the shaft being illustrated in Fig. 7. A further movement of coupler 128 toward the right will cause the external teeth of the coupler to mesh with idler 118, whereby the shaft 121 will be driven in a reverse direction. Shaft 34 is preferably provided with a central conduit 141 and radial outlets 142 and 143 by which the various overrunning clutches are lubricated, the lubricant being supplied from any source (not shown) by conduit 144.

The operation of the above transmission is as follows:

Assuming that shaft 10 is at rest, weights 21 will be in their innermost position and weights 22 will exert but a very slight pressure upon the clutch plates by reason of spring 64. In this position of the weights 21, member 54 will be moved toward the left, as viewed in Fig. 1, whereby cage 51 will be rotated counter clockwise to bring rollers 44 in contact with cams 47. In this position of the second-speed overrunning clutch, gear 41 cannot act as a driving member to move shaft 34 in a clockwise direction, and first or low-speed gear 101 is in position to act as a driving member by reason of the overrunning clutch, shown in Fig. 3. If shaft 10 be rotated at a moderate speed and with a substantial load on shaft 121, the weights 21 and 22 will exert insufficient pressure upon the clutch plates 17 and 18 to drive the shaft 34, and a relative sliding movement will occur between the plates because of the driving action of gear 101. As gear 41 is also driven positively by the counter shaft 109 through the medium of gears 114 and 113, gear 41 because of its reduced size relative to gear 101, will be driven at a greater speed than shaft 34 which is positively connected to gear 101 through its overrunning clutch, and therefore gear 41 will be driven faster than the shaft 34. The relative movement causes spring ring 94 to expand and retard the cam member 77. Cam 76 will then advance relative to cam member 77 in the direction of the arrow, as viewed in Fig. 6, and cause rollers 83 to advance along the cam faces 81 and 82 untilfurther movement is arrested by the contact of rollers 83 with shoulders 91 and 92, in which position nut 61 will be forced toward the left, as viewed in Fig. 1, to collapse the weights 21 and 22 and completely disengage the friction plates of the high speed clutch. In this position of the mechanism and assuming that the coupler 128 is in the position shown in Fig. 1, shaft 121 will be driven from shaft 10 by gears 14, 113, 116, and 101, it being realized that the second-speed overrunning clutch rollers 44 are disengaged by counter clockwise rotation of cage 51 when member 54 moves toward the left.

If the load upon the propeller shaft 121 is low enough and the operator believes that the second-gear may be engaged, accelerator pedal 151 is momentarily released to close throttle 152. The cams 76 and 77 will then be returned to the position shown in Fig. 6 as the speed of gear 41 has been reduced below that of shaft 34. At the same time weights 21 will fly outwardly by centrifugal force and move the member 54 toward the right whereupon the cage 51 is rotated in a clockwise direction, as viewed in Fig. 2, and gear 41 is in a position to assume the drive. Weights 21 and 22 tend to engage the high speed clutch, but if the load on the shaft 121 be great enough to require a second-speed gear, relative movement between plates 17 and 18 will occur, whereupon the gear 41 will drive the shaft 34 through the medium of rollers 44, race 46 and nut 61, and this latter member will be moved toward the left, as viewed in Fig. 1, by reason of its external threads which coact with internal threads formed on the race member 46, which movement will again result in the depression of the weights and allow the vehicle to be driven in the second speed gear with the high-speed clutch completely disengaged. After weights 21 are depressed by member 61, it might be thought that member 54 would also move toward the left to throw the overrunning clutch to an inoperative position, but this will not be the case as rollers 44 will be under load and the resistance to disengagement is great enough to prevent member 54 from moving toward the left to disengage the clutch.

If the load on shaft 121 should further decrease, the engine will gain in speed and weights 21 and 22 will be thrown outwardly with sufficient force to engage plates 17 and 18 in driving relation, whereupon the transmission will be in the high-gear or direct driving position wherein shaft 34 is directly coupled to shaft 10, and second-speed gear 41 may overrun shaft 34. In the high-speed position of weights 21 and 22, member 54 is moved toward the right by weights 21 during the time that the vehicle is operating in the high-gear and rollers 44 are rotated clockwise to pick up the drive in second-gear whenever the load should increase to a point whereby clutch slippage occurs.

If the load on shaft 121 should increase to a point that the coaction of plates 17 and 18 is insufficient to drive the vehicle in high-gear, the clutch will slip slightly, whereupon gear 41 will pick up the load and force member 61 toward the left to displace weights 21 and 22 and disengage the clutch. If the load upon shaft 121 should increase still further and the operator wishes to engage low gear, it is only necessary for him to momentarily close the throttle 152 by releasing the accelerator pedal 151, whereupon the car will momentarily drive the engine and the load will be taken off of gear 41 permitting member 54 to move toward the left against the decreased force of weights 21 and disengage the second-speed overrunning clutch, in which position roller 44 is in contact with cam 47, and gear 41 is free to overrun the shaft 34. Upon a re-opening of the throttle the action will be the same as in starting the car from rest, and nut 61 will move toward the left to completely disengage the high-speed clutch.

It will be noted that with the above described transmission installed in an automobile, in descending a hill the shaft 34 is able to overrun both gears 101 and 41, therefore the engine is unable to act as a brake except in the high-speed gear. It is desirable to use one of the other gear ratios in descending a hill, and to this end there has been provided a collar 153 having an inclined face 154 that is adapted to engage weights 21 and 22 and move them to the depressed or central position, when collar 153 is moved toward the right from the position shown in Fig. 1 to the position shown in Fig. 8. The collar is slidably splined upon the casing 19 and provided with an insert portion 156 having a groove within which rests a fork 157 secured to a longitudinally movable rod 158 by bolts 159. Rod 158 is provided with a notch 161 within which is the free end 162 of a lever 163 pivotally mounted on the casing 11 at 164. The opposite end of lever 163 is pivotally secured at 166 to a piston rod 167 slidably movable in the end cap 168 of cylinder 169 that is secured to casing 11 by arm 171 pivotally secured to the cylinder at 172. A piston 173 is secured to the end of rod 167 and is normally urged toward the left as viewed in Fig. 7 by spring 174. The portion of the cylinder to the left of piston 173 is connected to a manually operable pre-selecting device 176 by pipe 177. A check valve 178 normally covers an opening 179 through which pipe 177 may be placed in communication with the passage 180. The portion of the cylinder to the right of piston 173 is connected to the pre-selecting device by pipe 181 and is in communication with passage 180 by opening 182. Intermediate the openings 179 and 182, is a third opening 183 normally closed by check valve 184 and having a communication with the engine manifold 186 by pipe 187. Within passage 180 is a piston valve having two spaced enlarged portions 188 and 189 interconnected by a reduced portion 191. The piston valve is manually movable by a handle 192 to either of two positions determined by grooves 193 within which a spring pressed ball 194 is adapted to seat. Check valve 178 is normally pressed upon its seat by spring 196 but may be moved to the open position by rod 197 adapted to be contacted by the end of lever 198 that is pivotally mounted on the pre-selecting device at 199. Lever 198 is normally held out of contact with rod 197 by spring 201. The end of lever 198 is pivotally connected at 202 to a rod 203 having slots 204 and 205. Within slot 204 projects the end 207 of a bell crank lever 208 pivotally mounted on frame 209 at 211. The upper end of bell crank 208 is connected with the throttle operating rod 212 which is operated by pedal 151 through the medium of lever 213 having a slotted end 214 adapted to receive a pin 216. Within slot 205 is projected the end 217 of bell crank 218 pivotally mounted on the frame 209 at 219 and having its opposite end 221 connected by rod 222 and lever 223 to a vehicle control pedal 224 which may be the main clutch control. It will be noted that when control handle 192 is pushed toward the right to the position shown in Fig. 7, the right side of piston 173 is subjected to the intake manifold suction which will raise check valve 184 and exhaust the right side 173 of cylinder 169 through pipe 181 which is in communication with passage 183 by reason of the reduced portion 191 between the enlarged portions 188 and 189. In this position of the selector, shaft 158 is retained in the position shown in Figs. 1 and 7 wherein collar 153 will allow weights 21 and 22 to move to their outermost position. If control handle 192 is moved to the left, openings 179 and 183 will be in communication with each other by virtue of the reduced portion 191 between the members 188 and 189, but the left side portion of cylinder 169 cannot be exhausted by the manifold suction because of spring pressed check valve 178. Upward movement of rod 197 will raise check valve 178 from its seat and permit both the suction of the manifold and spring 174 to move piston 173 towards the left, and it will be noted that in this position of the handle 192, enlarged portion 188 will be to the left of opening 182 and atmospheric pressure may enter the cylinder to the right of piston 173 by means of pipe 181. It will also be noted that depression of either accelerator 151 or clutch pedal 224 will cause rod 203 to be moved downwardly and actuate rod 197 by means of the lever 198. In the operation of the mechanism above described, if the operator of the vehicle decides that he may need the engine as a brake in descending a hill, handle 192 will be moved outwardly whereby the left side of piston 173 will be placed in communication with the engine manifold 186 as soon as valve 178 is lifted from its seat. The operation of handle 192 may be termed a pre-selective operation, for nothing happens at this time and the operation of the transmission is automatic until clutch pedal 224 is fully depressed.

At this time it is assumed that the throttle 152 is closed; therefore, as soon as the clutch is released the weights 21 and 22 will be moved to their inner position by sleeve 153 acted upon by fork 157 which moves with rod 158 under force of both spring 174 and engine suction. Spring pressed member 54 can then move to the left and the cage 51 will be rotated in a counter clockwise direction, as viewed in Fig. 2, whereupon the second-speed overrunning clutch is in a position whereby shaft 34 may drive gear 41 in a clockwise direction and the motor may be used as a brake in the second-speed gear ratio. If it is desired to engage the positive second-speed gear in ascending a hill, handle 192 is placed in its outward position and full depression of accelerator pedal 151 will move rod 203 to lift the check valve 178 from its seat and move piston 173 toward the left in the same manner as before. However, due to lack of vacuum at open throttle, weights 21 and 22 are not completely collapsed, but merely take pressure off the clutch pack and member 54 does not move.

Whenever it is desired to again place the transmission in the automatic position, handle 192 is pushed to its inner position, as shown in Fig. 7, wherein the right side of piston 173 is placed into communication with the intake manifold 186 and the left side of the piston is in communication with the atmosphere by means of opening 227, the reduced portion 228, and the opening 179, it being understood that spring 196 is light enough to enable the atmospheric pressure to open valve 178.

While a preferred embodiment of the invention has been illustrated and described, it is understood that this showing and description are illustrative only and that the invention is not limited to the form shown and described, or otherwise, except by the terms of the following claims.

What is claimed is:

1. An automatic variable speed transmission comprising a driving shaft, a driven shaft, a friction clutch for connecting the shafts in a high speed ratio, first and second speed gear trains, a counter shaft geared to the driving shaft and both of said gear trains for connecting the driving and driven shafts around the friction clutch, each of said gear trains having movable means associated therewith for controlling the friction clutch, the controlling means of the first speed gear train including a pair of cooperative relatively movable cams one of which is frictionally secured to the driven shaft and the other of which is secured to a member of the second speed gear train, said cams being arranged to disengage the clutch upon relative rotation of the cams in one direction, said first and second speed gear trains including overrunning clutches, and means associated with said second gear train adapted to prevent engagement of the second speed overrunning clutch when the first speed gear train is operative.

2. An automatic variable speed transmission comprising a driving shaft, a driven shaft, a centrifugally actuated friction clutch for connecting the shafts in a high speed ratio, first and second speed gear trains, a counter shaft geared to the driving shaft and both of said gear trains for connecting the driving and driven shafts around the friction clutch, each of said gear trains having movable means associated therewith for controlling the friction clutch, the controlling means of the first speed gear train including a pair of relatively movable cooperative cams concentric with the driven shaft one of which is frictionally secured to the driven shaft and the other of which is secured to a member of the second speed gear train, said cams being arranged to disengage the friction clutch upon relative rotation of the cams in one direction, said first and second speed gear trains including overrunning clutches, and means associated with said second gear train adapted to prevent engagement of the second speed overrunning clutch when the first speed gear train is operative.

3. An automatic variable speed transmission comprising a driving shaft, a driven shaft, a clutch for connecting the shafts in a high gear ratio, centrifugal weights for actuating said clutch, first and second speed gear trains for connecting said shafts around said clutch in accordance with the load requirements, an overrunning clutch in the first speed gear train, an overrunning clutch in the second speed gear train adapted to have its overrunning direction reversed, automatic means for holding the second gear clutch in position to permit overrunning of the second speed gear and prevent overrunning of the driven shaft when the weights are in their inner position, and means including a cam device actuated by an overrunning action of the second speed gear train with respect to the driven shaft to force the weights to their inner position when the first speed gear train is operative, said cam device including two members one of which is positively driven by one of the gear trains and the other of which is frictionally secured to the driven shaft and movable to depress the weights.

4. An automatic variable speed transmission comprising a driving shaft, a driven shaft, a clutch for connecting the shafts in a high gear ratio, centrifugal weights for actuating said clutch, first and second speed gear trains for connecting said shafts around said clutch in accordance with the load requirements, an overrunning clutch in the first speed gear train, an overrunning clutch in the second speed gear train adapted to have its overrunning direction reversed, automatic means for holding the second gear clutch in position to permit overrunning of the second speed gear and prevent overrunning of the driven shaft when the weights are in their inner position, means including a cam device actuated by an overrunning action of the second speed gear train with respect to the driven shaft to force the weights to their inner position when the first speed gear train is operative, said cam device including two members one of which is positively driven by the second speed gear train and the other of which is frictionally secured to the driven shaft and movable to depress the weights, and a member of the first speed gear train being rotatably supported on a member of the second speed gear train.

5. An automatic variable speed transmission comprising a driving shaft, a driven shaft, a clutch for connecting the shafts in a high gear ratio, centrifugal weights for actuating said clutch, first and second speed gear trains for connecting said shafts around said clutch in accordance with the load requirements, an overrunning clutch in the first speed gear train, an overrunning clutch in the second speed gear train adapted to have its overrunning direction reversed, automatic means for holding the second gear clutch in position to permit overrunning of the second speed gear and prevent overrunning of the driven shaft when the weights are in their inner position, means including a cam device actuated by an overrunning action of the second speed gear train with respect to the driven shaft to force the weights to their inner position when the first speed gear train is operative, said cam device including two members one of which is positively driven by one of the gear trains and the other of which is frictionally secured to the driven shaft and movable to depress the weights, and manually controlled means for forcing the weights to their inner position at the will of the operator whereby the high speed clutch is disengaged and the second speed gear clutch is automatically placed in position to prevent overrunning of the shaft.

6. An automatic variable speed transmission comprising a driving shaft, a driven shaft, a friction clutch for connecting the shafts in a high speed gear ratio, centrifugal weights for actuating the clutch, first and second speed gear trains for connecting the shafts around the clutch, said gear trains being operative by load on the driven shaft, means for depressing the weights to disengage the friction clutch when either gear train is operative, said first speed gear train including a one-way overrunning clutch, said second speed gear train including a selective two-way overrunning clutch, means for moving the second speed clutch to a position whereby the shaft may overrun the gear train when the weights are expanded and to a position whereby the gear train may overrun the shaft when the weights are depressed, and means associated with both of said gear trains for depressing the weights during the operation of either to drive the driven shaft.

7. An automatic variable speed transmission comprising a driving shaft, a driven shaft, a friction clutch for connecting the shafts in a high speed gear ratio, centrifugal weights for actuating the clutch, first and second speed gear trains for connecting the shafts around the clutch, said gear trains being operative by load on the driven shaft, means for depressing the weights to disengage the friction clutch when either gear train is operative, said first speed gear train including a one-way overrunning clutch, said second speed gear train including a selective two-way overrunning clutch, means for moving the second speed clutch to a position whereby the shaft may overrun the gear train when the weights are expanded and to a position whereby the gear train may overrun the shaft when the weights are depressed, means associated with both of said gear trains for depressing the weights during the operation of either to drive the driven shaft, and manually controlled means for depressing the weights.

8. An automatic variable speed transmission comprising a driving shaft, a driven shaft, a friction clutch for connecting the shafts in a high speed gear ratio, centrifugal weights for actuating the clutch, first and second speed gear trains for connecting the shafts around the clutch, said gear trains being operative by load on the driven shaft, means for depressing the weights to disengage the friction clutch when either gear train is operative, said first speed gear train including a one-way overrunning clutch, said second speed gear train including a selective two-way overrunning clutch, means for moving the second speed clutch to a position whereby the shaft may overrun the gear train when the weights are expanded and to a position whereby the gear train may overrun the shaft when the weights are depressed, means operated by each of said gear trains for depressing the weights during the operation of either to drive the driven shaft, a vehicle control, a servo-motor for depressing the weights, means for predetermining an operation of the servo-motor, and a control for the servo-motor interconnected with the vehicle control to operate concurrently therewith.

9. An automatic variable speed transmission for an engine driven vehicle comprising a driving shaft, a driven shaft, a clutch for connecting the shafts in a high speed ratio, a gear train for connecting the shafts in a low speed ratio including controllable means for permitting and preventing the driven shaft to overrun the gear train, and manually controlled means to disengage the high speed clutch and means controlled by clutch disengagement to place the overrunning means in a position to prevent overrunning of the gear train by the driven shaft.

10. An automatic variable speed transmission for an engine driven vehicle comprising a driving shaft, a driven shaft, a clutch for connecting the shafts in a high speed ratio having an engaged position and a disengaged position, a gear train for connecting the shafts in a low speed ratio including controllable means for permitting and preventing the driven shaft to overrun the gear train, manually controlled means to disengage the high speed clutch and means controlled by clutch disengagement arranged to place the overrunning means in a position to prevent overrunning of the gear train by the driven shaft when the clutch is disengaged, and a settable device controlling the operation of the manual controlled means in a manner to render the same operative or inoperative to disengage the high speed clutch.

11. An automatic variable speed transmission for an engine driven vehicle comprising a driving shaft, a driven shaft, a clutch for connecting the shafts in a high speed ratio having an engaged position and a disengaged position, a gear train for connecting the shafts in a low speed ratio including controllable means for preventing and permitting the driven shaft to overrun the gear train, manually controlled means to disengage the high speed clutch and means actuated by clutch disengagement arranged to place the overrunning means in a position to prevent overrunning of the gear train by the driven shaft when the clutch is disengaged, a vehicle control, a settable device controlling the operation of the manual controlled means in a manner to render the same operative or inoperative to disengage the high speed clutch, and means interconnecting the manually controlled means and the vehicle control whereby they are operated concurrently.

12. An automatic variable speed transmission comprising a driving shaft, a driven shaft, a friction clutch, centrifugal weights for actuating the clutch, a gear train for connecting the shafts around the clutch including an overrunning clutch, said overrunning clutch having forward and reverse running positions, said reverse position preventing overrunning of the gear train by the shaft in a forward direction, means actuated by the weights to position the overrunning clutch in the reverse overrunning position to prevent the shaft from overrunning the gear train in a forward direction when the weights are depressed, and manually controlled means for depressing the weights.

13. An automatic variable speed transmission comprising a driving shaft, a driven shaft, a friction clutch, centrifugal weights for engaging the clutch in their outward position and disengaging the clutch in their depressed position, a gear train for connecting the shafts around the clutch including an overrunning clutch, said overrunning clutch having two opposite overrunning positions one of which prevents overrunning of the gear train by the shaft in a forward direction, means actuated by the weights to position the overrunning clutch to prevent the shaft from overrunning the gear train in a forward direction when the weights are depressed, and manually controlled means for depressing the weights, said means including a device for preselecting the depressed position of the weights.

14. An automatic variable speed transmission for an engine driven vehicle comprising a driving shaft, a driven shaft, a torque responsive friction clutch for connecting the shafts in a high speed ratio, means for automatically connecting the shafts in a lower speed ratio when the clutch is disengaged, a servo-motor for disengaging the friction clutch, a preselective device arranged to predetermine a servo-motor movement, mechanism for connecting the servo-motor to a power source, a vehicle control, and means interconnecting the vehicle control and the mechanism to connect the servo-motor with the power source upon an operation of the vehicle control.

15. In an automatic variable speed transmission, a driving shaft, a driven shaft aligned therewith, a friction clutch for directly connecting the shafts, centrifugal weights arranged to increase the clutch capacity in accordance with the speed of the driven shaft, an intermediate and a low speed gear train each including an overrunning device for connecting the shafts around the clutch, said intermediate speed device arranged to have both a forward and reverse overrunning position, means actuated by torque reaction of the intermediate gear train for depressing the weights to disengage the clutch, means operated by overrunning of the driven shaft by the intermediate gear train for depressing the weights to disengage the clutch, and spring actuated means arranged to move the intermediate speed gear overrunning device to the reverse overrunning position wherein the intermediate gear train may overrun the driven shaft when the weights are depressed and the driving force is removed.

16. In an automatic variable speed transmission, a driving shaft, a driven shaft aligned therewith, a friction clutch for directly connecting the shafts, centrifugal weights arranged to increase the clutch capacity in accordance with the speed of the driven shaft, an intermediate and a low speed gear train each including an overrunning device for connecting the shafts around the clutch, said intermediate speed device arranged to have both a forward and a reverse overrunning position, means actuated by torque reaction of the intermediate gear train for depressing the weights to disengage the clutch, means operated by overrunning of the driven shaft by the intermediate gear train for depressing the weights to disengage the clutch, and spring actuated means arranged to move the intermediate speed gear overrunning device to the reverse overrunning position wherein the intermediate gear train may overrun the driven shaft when the weights are depressed and the driving force is removed, both of said disengaging means including a nut slidably splined to the driven shaft.

17. In an automatic variable speed transmission, a driving shaft, a driven shaft, a friction clutch for directly connecting the shafts in a high speed gear ratio, an intermediate speed gear train including an overrunning device having a position permitting overrunning of the driven shaft and a position permitting overrunning of the gear train, means actuated by torque reaction of the intermediate speed gear train for disengaging the friction clutch, a low speed gear train including an overrunning device, resilient means for positioning the intermediate speed overrunning device to a position wherein the intermediate speed gear overruns the driven shaft when the clutch is disengaged and the load is removed from the intermediate gear train, and means operated by overrunning of the intermediate speed gear train when it is driven by the low speed gear train for disengaging the clutch.

18. In an automatic variable speed transmission, a driving shaft, a driven shaft, a clutch for connecting the shafts in a high speed ratio, gear means including a clutch for connecting the shafts in an intermediate speed ratio, gear means for connecting the shafts in a low speed ratio, centrifugal means mounted on the driven portion of the high speed clutch and cooperative with the high speed clutch to engage the same when the driven shaft is rotated above a predetermined speed, and spring pressed means coacting with the centrifugal means and the intermediate speed clutch to disengage both clutches when the driven shaft is at rest to insure starting of the transmission in the low speed ratio.

19. In an automatic variable speed transmission, a driving shaft, a driven shaft, a clutch for connecting the shafts in a high speed ratio, gear means including an overrunning clutch for connecting the shafts around the high speed clutch in an intermediate speed ratio, said overrunning clutch being movable to an inoperative position wherein it is inoperative to transmit forward motion from the driving shaft to the driven shaft, gear means connecting the shafts around both the high speed clutch and the intermediate speed gear means in a low speed ratio, weighted levers pivotally mounted on the driven portion of the high speed clutch for controlling the same, said levers being arranged to disengage the clutch when depressed, and a spring pressed member associated with the levers and the overrunning clutch and arranged to depress the levers and move the overrunning clutch to the inoperative position when the driven shaft is at rest to insure starting of the transmission in the low speed ratio.

20. An automatic variable speed transmission comprising a driving shaft, a driven shaft, a friction clutch for connecting the shafts in a high speed ratio, a counter shaft geared to the driving shaft, first and second speed gears on the counter shaft, first and second speed gears on said driven shaft meshed with said counter shaft gears for connecting the driving and driven shafts around the friction clutch, means for disengaging the friction clutch when either of said gear trains is operative, said disengaging means being movable by torque reaction on the second speed gear, an overrunning clutch between each of said gear trains and the driven shaft, said second speed gear clutch having both an overrunning and a nondriving position, spring operated means for moving the second speed gear overrunning clutch to a position wherein the second speed gear is in nondriving relation to the driven shaft when the friction clutch is released, means for moving the disengaging member to release the friction clutch when the first speed gear train is operative including a pair of coacting cams one of which is movable, one of said cams being frictionally secured to the driven shaft and the other of which is secured to the driven shaft second speed gear, said cams being arranged to disengage the friction clutch when the second speed gear is driven faster than the driven shaft by the geared connection through the counter shaft of the second speed gear with the first speed gear train.

21. An automatic variable speed transmission comprising a driving shaft, a driven shaft, a friction clutch for connecting the shafts in a high speed ratio, centrifugal weights for controlling the friction clutch, a counter shaft geared to the driving shaft, first and second speed gears on the counter shaft, first and second speed gears on said driven shaft meshed with said counter shaft gears for connecting the driving and driven shafts around the friction clutch, means for collapsing the weights to disengage the friction clutch when either of said gear trains is operative, said disengaging means being movable by torque reaction on the second speed gear, an overrunning clutch between each of said gear trains and the driven shaft, said second speed gear clutch having both an overrunning and a nondriving position, spring operated means for moving the second speed gear overrunning clutch to a position wherein the second speed gear is in nondriving relation to the driven shaft when the friction clutch is released, means for moving the disengaging member to release the friction clutch when the first speed gear train is operative including a pair of coacting cams one of which is axially movable along the driven shaft, one of said cams being frictionally secured to the driven shaft and the other of which is secured to the driven shaft second speed gear, said cams being arranged to disengage the friction clutch when the second speed gear is driven faster than the driven shaft by the geared connection through the counter shaft of the second speed gear with the first speed gear train.

ROMEO M. NARDONE.
FRANCIS LINDER.